US011097796B2

(12) United States Patent
Abdellatif et al.

(10) Patent No.: US 11,097,796 B2
(45) Date of Patent: Aug. 24, 2021

(54) ARTICULATED MAGNET-BEARING LEGS FOR UAV LANDING ON CURVED SURFACES

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Fadl Abdellatif, Thuwal (SA); Mohamed Abdelkader, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 120 days.

(21) Appl. No.: 16/688,706

(22) Filed: Nov. 19, 2019

(65) Prior Publication Data
US 2020/0172231 A1 Jun. 4, 2020

Related U.S. Application Data

(60) Provisional application No. 62/772,700, filed on Nov. 29, 2018.

(51) Int. Cl.
*B64C 25/32* (2006.01)
*B62D 57/024* (2006.01)
(Continued)

(52) U.S. Cl.
CPC ............. *B62D 57/024* (2013.01); *B60G 3/01* (2013.01); *B60G 11/00* (2013.01); *B60K 1/02* (2013.01);
(Continued)

(58) Field of Classification Search
CPC .......... B64C 2201/027; B64C 2201/12; B64C 2201/123; B64C 2201/127;
(Continued)

(56) References Cited

U.S. PATENT DOCUMENTS 10,442,522 B2 * 10/2019 Oldroyd ................ B64C 27/52
10,529,221 B2 * 1/2020 Jarrell .................... H05B 47/19
(Continued)

FOREIGN PATENT DOCUMENTS

CN 106527487 A 3/2017
CN 206318030 U 7/2017
(Continued)

OTHER PUBLICATIONS

International Preliminary Report on Patentability in corresponding PCT Application No. PCT/US2019/063423 dated Feb. 18, 2021. 17 pages.
(Continued)

*Primary Examiner* — Medhat Badawi
(74) *Attorney, Agent, or Firm* — Leason Ellis LLP

(57) ABSTRACT

An unmanned aerial vehicle (UAV) for landing and perching on a curved ferromagnetic surface is provided. The UAV includes a plurality of articulated legs. Each articulated leg includes: a magnet configured to magnetically attach to the curved ferromagnetic surface; and a magnetic foot for housing the magnet and configured to magnetically articulate towards and attach to the curved ferromagnetic surface using the magnet in a perpendicular orientation with respect to the curved ferromagnetic surface, in response to the UAV approaching the curved ferromagnetic surface, in order to land the UAV on the curved ferromagnetic surface and for the UAV to perch on the curved ferromagnetic surface after the landing. The magnetic foot is configured to remain magnetically attached to the curved ferromagnetic surface
(Continued)

while the UAV is perched on the curved ferromagnetic surface.

32 Claims, 14 Drawing Sheets

(51) Int. Cl.
| | |
|---|---|
| B60K 1/02 | (2006.01) |
| B62D 21/09 | (2006.01) |
| B60G 3/01 | (2006.01) |
| B60G 11/00 | (2006.01) |
| B62D 61/12 | (2006.01) |
| B60R 11/00 | (2006.01) |
| G01N 29/265 | (2006.01) |
| G01N 29/04 | (2006.01) |
| B62D 9/00 | (2006.01) |
| B64C 25/24 | (2006.01) |
| B64C 25/36 | (2006.01) |
| B64C 25/40 | (2006.01) |
| B64C 39/02 | (2006.01) |
| B64D 1/02 | (2006.01) |
| G01B 17/02 | (2006.01) |
| G05D 1/00 | (2006.01) |
| G05D 1/10 | (2006.01) |
| G06T 7/50 | (2017.01) |
| G01S 17/86 | (2020.01) |
| G01S 17/89 | (2020.01) |
| G06K 9/00 | (2006.01) |
| H04N 5/222 | (2006.01) |

(52) U.S. Cl.
CPC .............. *B60R 11/00* (2013.01); *B62D 9/002* (2013.01); *B62D 21/09* (2013.01); *B62D 61/12* (2013.01); *B64C 25/24* (2013.01); *B64C 25/32* (2013.01); *B64C 25/36* (2013.01); *B64C 25/405* (2013.01); *B64C 39/02* (2013.01); *B64C 39/024* (2013.01); *B64D 1/02* (2013.01); *G01B 17/02* (2013.01); *G01N 29/04* (2013.01); *G01N 29/265* (2013.01); *G01S 17/86* (2020.01); *G01S 17/89* (2013.01); *G05D 1/0088* (2013.01); *G05D 1/0094* (2013.01); *G05D 1/101* (2013.01); *G06K 9/00664* (2013.01); *G06T 7/50* (2017.01); *H04N 5/2226* (2013.01); *B60R 2011/004* (2013.01); *B60R 2011/008* (2013.01); *B60R 2011/0084* (2013.01); *B64C 2201/027* (2013.01); *B64C 2201/12* (2013.01); *B64C 2201/123* (2013.01); *B64C 2201/127* (2013.01); *B64C 2201/141* (2013.01); *B64C 2201/18* (2013.01); *G01N 2291/0289* (2013.01); *G01N 2291/02854* (2013.01); *G06T 2207/10028* (2013.01)

(58) Field of Classification Search
CPC .......... B64C 2201/141; B64C 2201/18; B64C 25/24; B64C 25/32; B64C 25/36; B64C 25/405; B64C 39/02; B64C 39/024; B60B 19/006; B60B 19/12; B60B 2900/931; B60G 11/00; B60G 2204/421; B60G 3/01; B60K 1/02; B60R 11/00; B60R 2011/004; B60R 2011/008; B60R 2011/0084; B60Y 2200/47; B60Y 2200/60; B62D 21/09; B62D 57/024; B62D 61/06; B62D 61/12; B62D 9/002; G01B 17/02; G01B 7/281; G01N 2291/02854; G01N 2291/0289; G01N 29/04; G01N 29/043; G01N 29/225; G01N 29/2493; G01N 29/265; G01S 17/86; G01S 17/89; G05D 1/0088; G05D 1/0094; G05D 1/101; G06K 9/0063; G06K 9/00664; G06T 2207/10028; G06T 7/50; G08G 5/0013; G08G 5/0021; G08G 5/0069; G08G 5/025; H04N 5/2226; B64D 1/02; F17D 5/00
See application file for complete search history.

(56) References Cited

U.S. PATENT DOCUMENTS

| | | | |
|---|---|---|---|
| 10,597,164 B2* | 3/2020 | Oldroyd | G05D 1/0072 |
| 10,661,898 B2* | 5/2020 | White, III | B64D 1/12 |
| 2009/0050750 A1* | 2/2009 | Goossen | B64C 39/024 244/76 R |
| 2010/0140415 A1* | 6/2010 | Goossen | B64C 39/024 244/23 A |
| 2016/0280359 A1 | 9/2016 | Semke et al. | |
| 2018/0061148 A1* | 3/2018 | Dudar | G08G 1/165 |
| 2019/0072953 A1* | 3/2019 | Maheshwari | B64C 39/024 |
| 2019/0263530 A1* | 8/2019 | Pike | B64C 27/08 |
| 2019/0389576 A1* | 12/2019 | White, III | B64C 25/04 |
| 2020/0089206 A1* | 3/2020 | Mukherjee | G05D 1/0094 |
| 2020/0132286 A1* | 4/2020 | Carlen | B64D 1/22 |
| 2020/0172231 A1* | 6/2020 | Abdellatif | G06K 9/0063 |

FOREIGN PATENT DOCUMENTS

| | | |
|---|---|---|
| CN | 206813306 U | 12/2017 |
| CN | 109334955 A | 2/2019 |
| CN | 208602694 U | 3/2019 |
| CN | 109573007 A | 4/2019 |
| CN | 208915429 U | 5/2019 |
| DE | 102016214655 A1 | 2/2018 |
| JP | 2018114822 A2 | 7/2018 |
| KR | 20140078251 A | 6/2014 |
| KR | 20190114129 A | 10/2019 |

OTHER PUBLICATIONS

Written Opinion of the International Preliminary Examining Authority in Corresponding International Application No. PCT/US2019/063423 dated Jun. 10, 2020. 8 pages.

Anonymous: Magnetsystem mit beweglichem Gewindezapfen und Kugelgelenk—Ferrit: Amazon. De Baumark Dec. 9, 2015 URL: https://www.amazon.de/Magnetsystem-mit-beweglichem-Geqindezapfen-Kugelgelenk/dp/B0194JPKFC [retrieved on Feb. 24, 2020].

International Search Report and Written Opinion in corresponding PCT Application No. PCT/US2019/063423 dated Mar. 9, 2020. 64 pages.

* cited by examiner

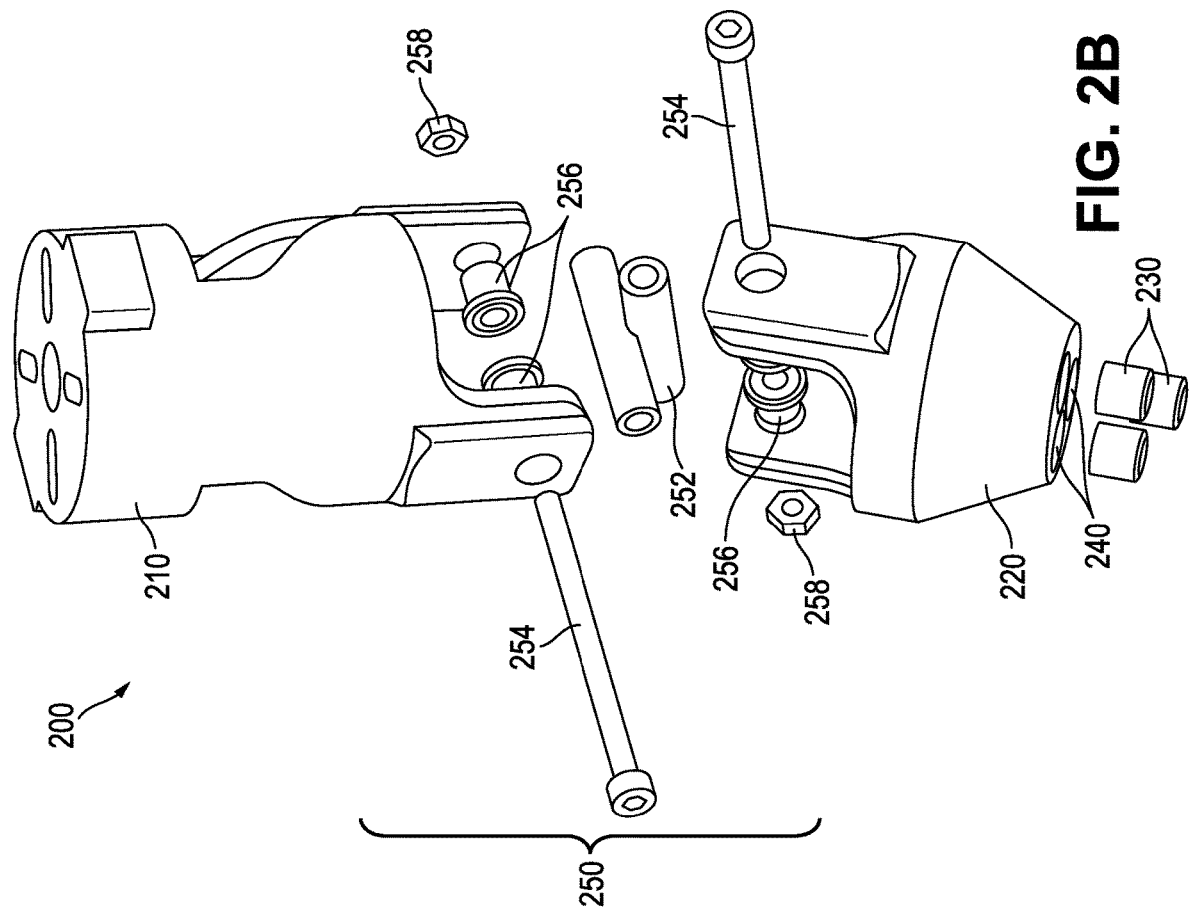
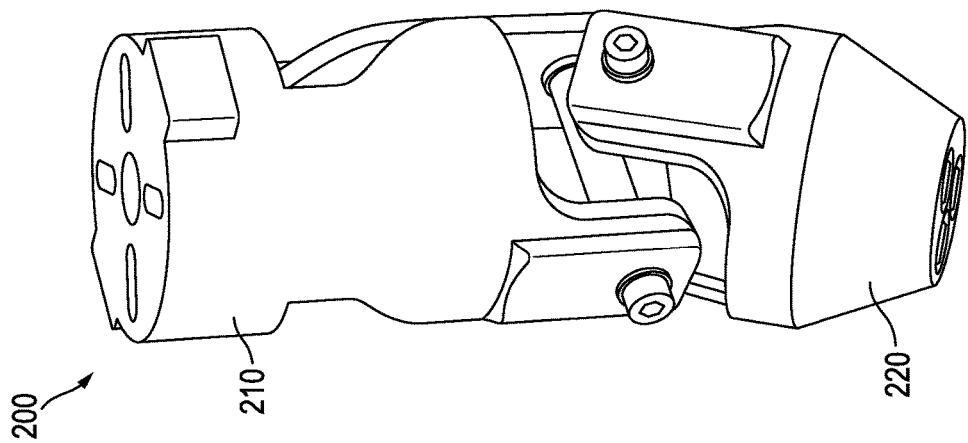
FIG. 2B
FIG. 2A

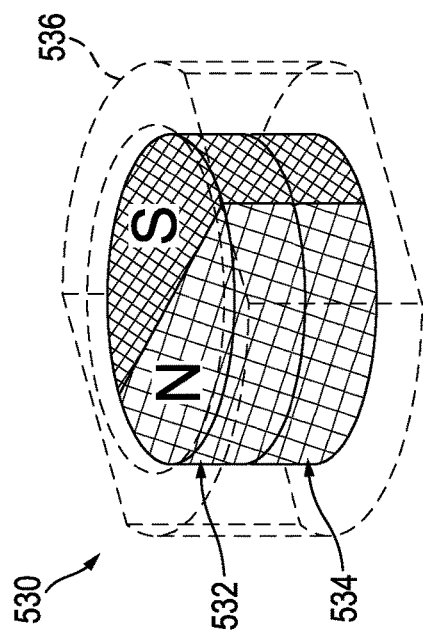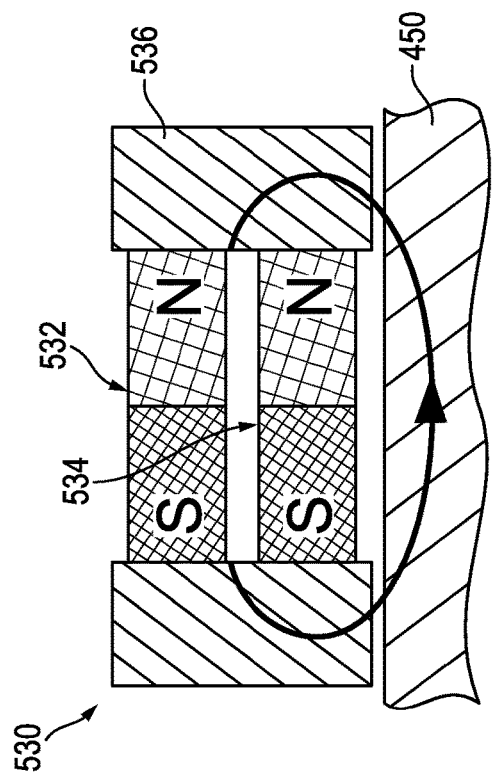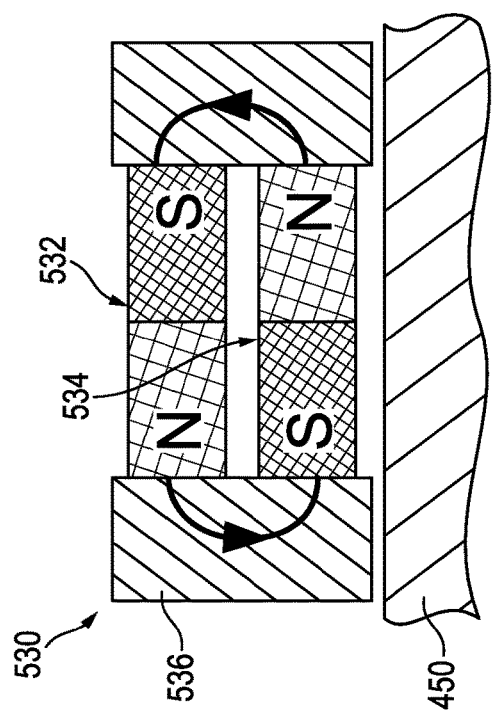

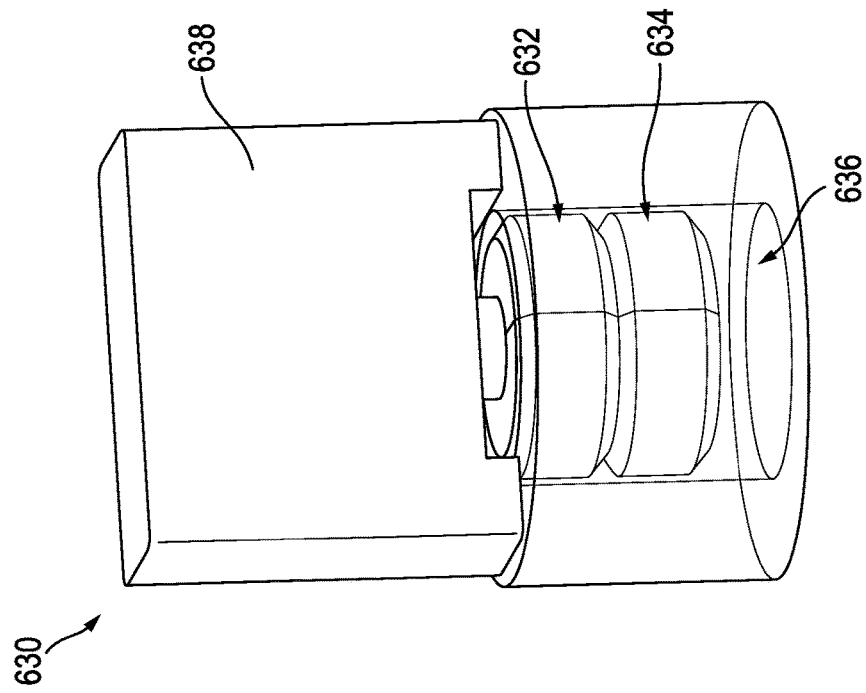
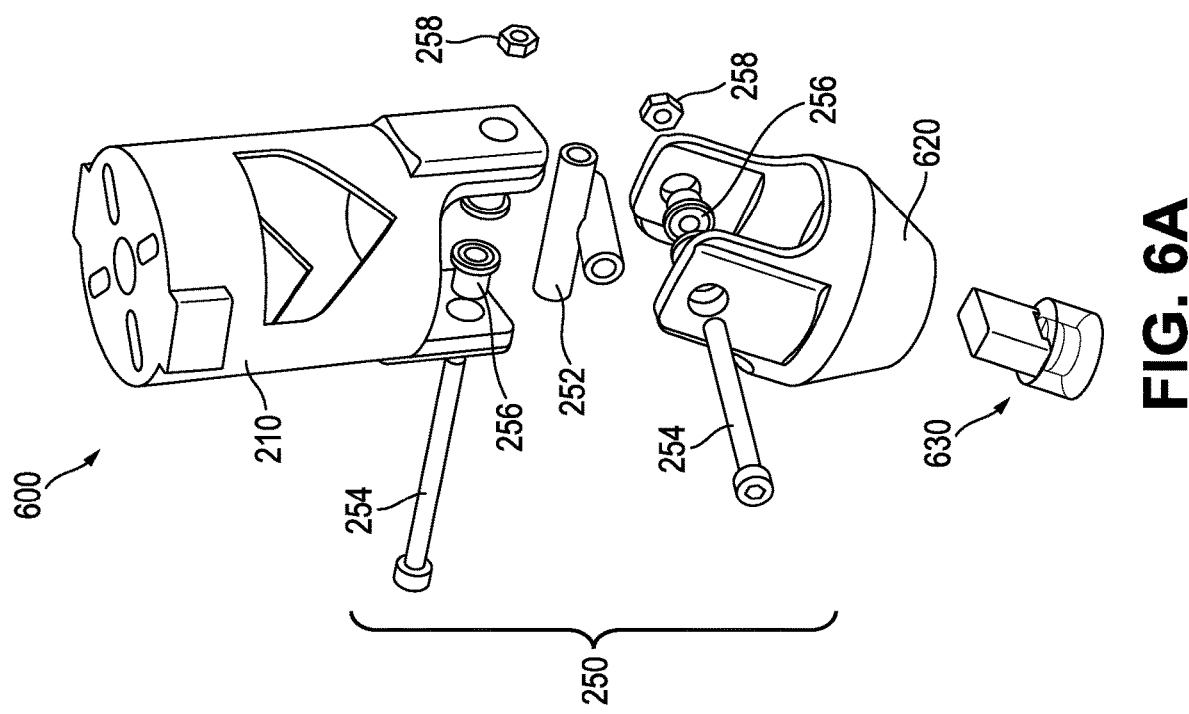

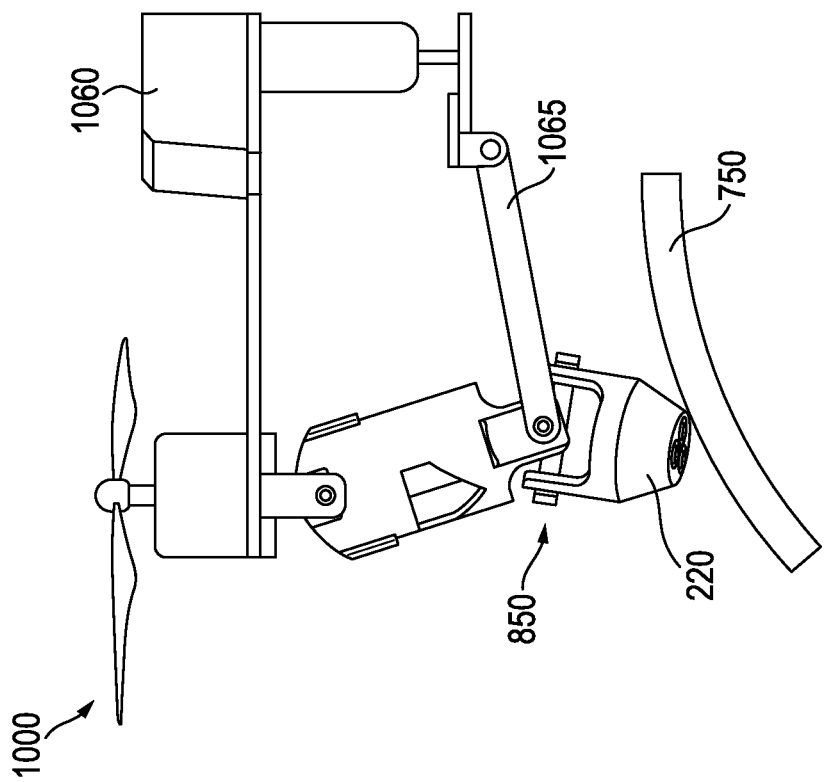
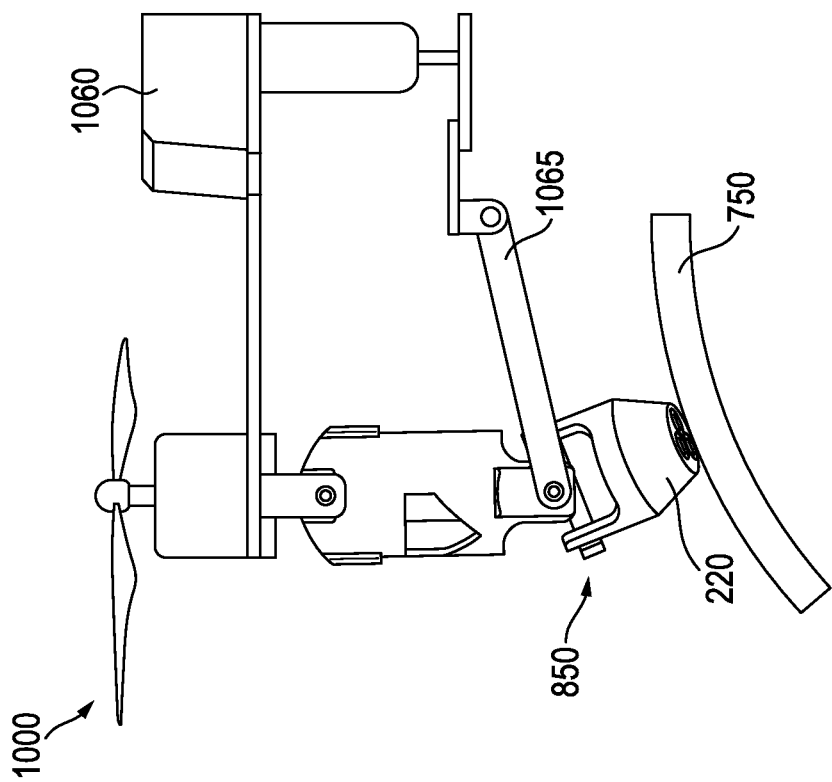

ARTICULATED MAGNET-BEARING LEGS FOR UAV LANDING ON CURVED SURFACES

CROSS-REFERENCE TO RELATED APPLICATION

The present application claims the benefit of U.S. Provisional Application No. 62/772,700, titled PERCHING UAV WITH RELEASABLE CRAWLER, filed on Nov. 29, 2018 with the U.S. Patent and Trademark Office, which is hereby incorporated by reference in its entirety.

FIELD OF THE DISCLOSURE

The present disclosure relates generally to the inspection and maintenance of a structure, and specifically to a perching unmanned aerial vehicle (UAV) having a releasable crawler for inspecting and maintaining the structure. In addition, the present disclosure relates generally to the inspection and maintenance of curved ferromagnetic structures, and specifically to a UAV having articulated magnet-bearing legs for landing on curved surfaces of such structures.

BACKGROUND OF THE DISCLOSURE

The inspection and maintenance of exposed metallic assets, such as pipes, storage tanks, and the like, can be difficult or impractical to perform by humans in some environments. In such circumstances, the use of automated UAV's may provide a workable alternative. However, such inspection and maintenance are often best performed using direct contact on the asset, versus hovering at a distance from the asset. A UAV, however, can be difficult to land, perch, or maneuver on the asset. Further, pipes (and other curved surface structures) can be especially challenging to inspect or maintain with a UAV, as these assets present curved surfaces with which to land, perch, or maneuver.

It is in regard to these and other problems in the art that the present disclosure is directed to provide a technical solution for an effective perching UAV having a releasable crawler for inspecting or maintaining a structure. It is also in regard to these and other problems in the art that the present disclosure is directed to provide a technical solution for an effective UAV having articulated magnet-bearing legs for landing or perching on curved surfaces.

SUMMARY OF THE DISCLOSURE

According to an embodiment, an unmanned aerial vehicle (UAV) for landing and perching on a curved ferromagnetic surface is provided. The UAV includes a plurality of articulated legs. Each articulated leg includes: a magnet configured to magnetically attach to the curved ferromagnetic surface; and a magnetic foot for housing the magnet and configured to magnetically articulate towards and attach to the curved ferromagnetic surface using the magnet in a perpendicular orientation with respect to the curved ferromagnetic surface, in response to the UAV approaching the curved ferromagnetic surface, in order to land the UAV on the curved ferromagnetic surface and for the UAV to perch on the curved ferromagnetic surface after the landing. The magnetic foot is configured to remain magnetically attached to the curved ferromagnetic surface while the UAV is perched on the curved ferromagnetic surface.

In an embodiment, the plurality of articulated legs comprises four articulated legs.

In an embodiment, each articulated leg further includes: a main body attaching the articulated leg to the UAV; and a passive articulation joint coupling the main body to the magnetic foot and configured to passively articulate the magnetic foot with two degrees of freedom with respect to the curved ferromagnetic surface.

In an embodiment, the magnet includes a permanent magnet.

In an embodiment, the permanent magnet includes an adjustable quantity of one or more permanent magnets.

In an embodiment, the magnetic foot includes a magnet housing configured to house the permanent magnet within the magnetic foot at an adjustable distance from the curved ferromagnetic surface when the UAV is perched on the curved ferromagnetic surface.

In an embodiment, the magnet includes a switchable magnet and the magnetic foot includes a motor or actuator configured to move or actuate internal magnets of the switchable magnet, in order to switch the switchable magnet on and off.

In an embodiment, the magnet includes an electro-permanent magnet configured to switch between on and off in response to a pulse of electric current.

In an embodiment, each articulated leg further includes a detachment motor configured to magnetically detach the magnetic foot from the curved ferromagnetic surface by tipping the magnetic foot away from the curved ferromagnetic surface.

In an embodiment, the UAV further includes a controller configured to use the detachment motor of each articulated leg to adjust a separation between the articulated legs prior to landing on the curved ferromagnetic surface.

In an embodiment, the UAV further includes a single detachment motor configured to detach the magnetic foot of each of the articulated legs from the curved ferromagnetic surface by tipping the magnetic foot away from the curved ferromagnetic surface.

In an embodiment, the UAV further includes a controller configured to use the single detachment motor to adjust a separation between the articulated legs prior to landing on the curved ferromagnetic surface.

According to another embodiment, an automated method of landing and perching an unmanned aerial vehicle (UAV) on a curved ferromagnetic surface is provided. The UAV includes a plurality of articulated legs. The method includes: approaching the curved ferromagnetic surface with the UAV; articulating a magnetic foot of each articulated leg in order to orient a magnet of the magnetic foot perpendicularly with respect to the curved ferromagnetic surface; landing the UAV on the curved ferromagnetic surface by magnetically attaching each magnetic foot to the curved ferromagnetic surface using the perpendicularly oriented magnet of the magnetic foot; and perching the UAV on the curved ferromagnetic surface after the landing by having each magnetic foot remain magnetically attached to the curved ferromagnetic surface.

In an embodiment, the plurality of articulated legs includes four articulated legs.

In an embodiment, each articulated leg further includes a main body attaching the articulated leg to the UAV, and articulating each magnetic foot includes passively articulating the magnetic foot with two degrees of freedom with respect to the curved ferromagnetic surface using a passive articulation joint coupling the main body to the magnetic foot.

In an embodiment, the magnet includes a permanent magnet.

In an embodiment, the permanent magnet includes an adjustable quantity of one or more permanent magnets, and the method further includes adjusting the quantity of the one or more permanent magnets in order to adjust a weight or magnetic strength of the magnetic foot.

In an embodiment, the magnetic foot includes a magnet housing configured to house the permanent magnet within the magnetic foot at an adjustable distance from the curved ferromagnetic surface when the UAV is perched on the curved ferromagnetic surface, and the method further includes adjusting a location of the permanent magnet with the magnetic foot in order to adjust a magnetic strength of the magnetic foot.

In an embodiment, the magnet includes a switchable magnet, and the method further includes moving or actuating internal magnets of the switchable magnet using a motor or actuator of the magnetic foot in order to switch the switchable magnet on and off.

In an embodiment, the magnet includes an electro-permanent magnet, and the method further includes using a pulse of electric current to switch the electro-permanent magnet between on and off.

In an embodiment, each articulated leg includes a detachment motor, and the method further includes using the detachment motor to tip the magnetic foot of each articulated leg away from the curved ferromagnetic surface in order to magnetically detach the magnetic foot from the curved ferromagnetic surface.

In an embodiment, the method further includes adjusting, by a controller of the UAV, a separation between the articulated legs prior to landing on the curved ferromagnetic surface by using the detachment motor of each articulated leg.

In an embodiment, the UAV further includes a single detachment motor, and the method further includes using the detachment motor to tip the magnetic foot of each articulated leg away from the curved ferromagnetic surface in order to magnetically detach the magnetic foot from the curved ferromagnetic surface.

In an embodiment, the method further includes adjusting, by a controller of the UAV, a separation between the articulated legs prior to landing on the curved ferromagnetic surface by using the single detachment motor.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIGS. 2A and 2B are profile and exploded views, respectively, of an example passively articulated magnet-bearing leg for landing a UAV on a curved ferromagnetic surface, according to an embodiment.

FIGS. 5A, 5B, and 5C are views of an example switchable magnet for use with a passively articulated magnet-bearing leg for landing or perching a UAV on a ferromagnetic surface, according to an embodiment.

FIG. 6A is an exploded view of an example passively articulated leg having a switchable magnet, while FIG. 6B is an enlarged view of the switchable magnet of FIG. 6A, according to an embodiment.

FIGS. 12A and 12B are side views of an articulated leg of the UAV of FIG. 10, illustrating the leg in attached and detached positions, respectively, with respect to a curved ferromagnetic surface.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1A:
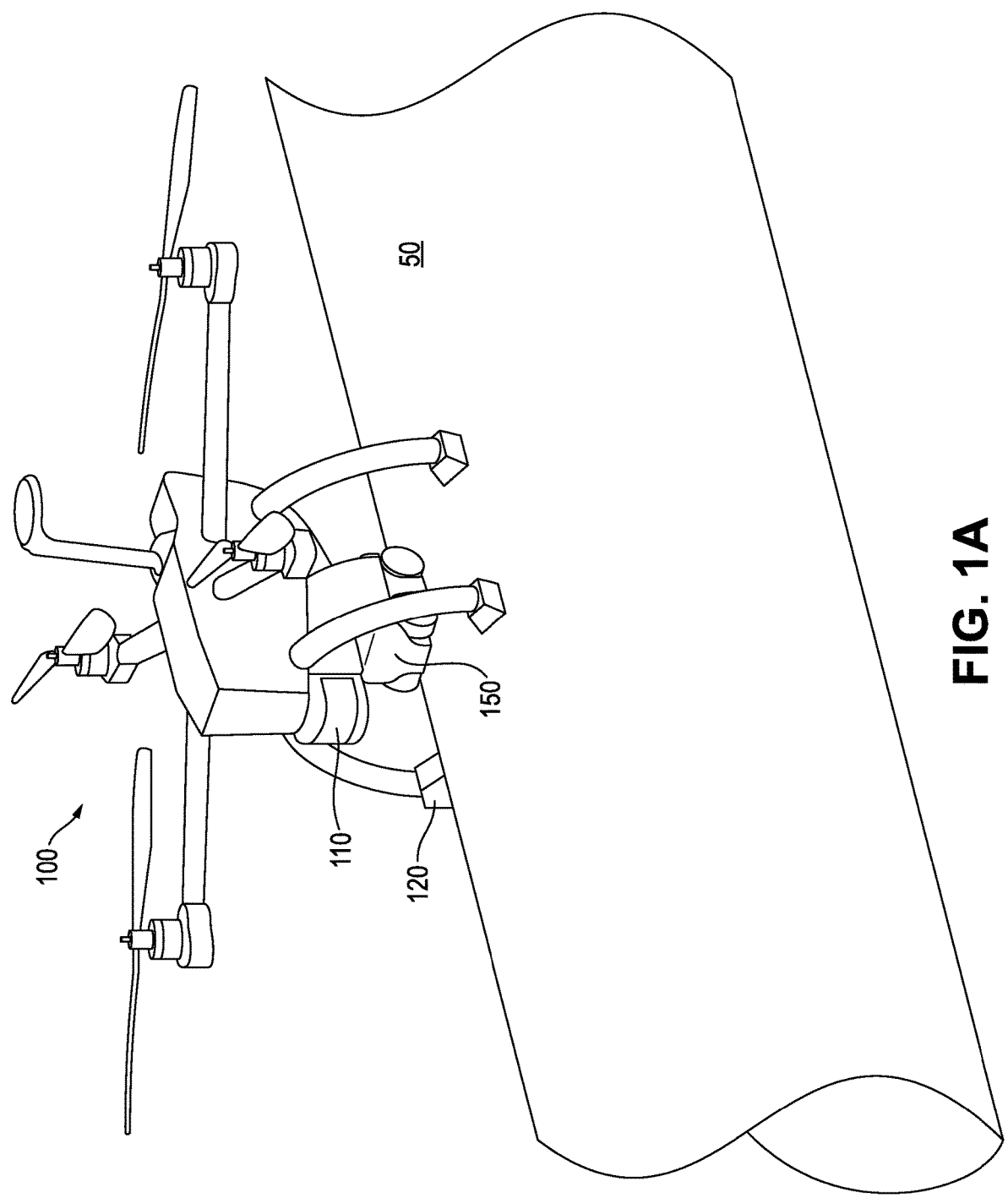
FIGS. 1A and 1B are illustrations of an example UAV perching on a structure, with the UAV having a releasable crawler for inspecting or maintaining the structure, according to an embodiment. The crawler is shown attached to the UAV in FIG. 1A and not attached to the UAV (e.g., crawling on the structure) in FIG. 1B.

In various example embodiments, a perching UAV having a releasable crawler for inspecting or maintaining a structure, such as a difficult-to-access pipe or storage tank, is provided. The UAV is a hybrid UAV that has advanced capabilities to perform contact inspection jobs on ferromagnetic surfaces such as carbon steel pipes and structures. The UAV can fly towards a pipe to be inspected, land on it autonomously (commonly referred to as perching), and deploy a releasable crawler to crawl around the pipe to perform, for example, elaborate inspection jobs.

As discussed earlier, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Sometimes the only way for people to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards.

Accordingly, in example embodiments, a perching UAV having a releasable crawler provides a solution to the aforementioned technical problems by having two vehicles in a mother/child configuration. Each vehicle is designed or optimized to perform the capabilities for which it is best suited. The vehicles include a perching UAV capable of flying and landing on a pipe, and a smaller magnetic crawler that is carried by and released from the UAV after landing or perching. The crawler can rove on the pipe and perform, for example, inspection scans such as thickness measurements using a UT sensor. This provides for a more feasible approach than having the whole UAV crawl around the pipe, which requires larger and heavier motors and risks collisions with nearby pipes and assets, especially with limited clearance constraints.

In further various example embodiments, a UAV for landing or perching on curved surfaces is provided. The UAV includes articulated magnet-bearing legs for landing or perching on curved ferromagnetic surfaces such as carbon steel pipes. In some such embodiments, the articulated legs are passively articulated in that the legs passively deploy through the magnetic attraction of their magnetic ends to the ferromagnetic surfaces. The UAV is capable of landing or perching on operational assets found in oil and gas facilities such as pipes, vessels, and structures. Most of these assets are made of carbon steel, so magnetic attachment works well for landing or perching a UAV. It should be noted that in some of these embodiments, the UAV also has a releasable crawler, while in some others of these embodiments, the UAV does not have a releasable crawler.

As discussed earlier, pipes and other curved surface structures can be especially challenging to inspect or maintain with a UAV, as these assets present curved surfaces with which to land and perch. In addition, these assets can be difficult to access during inspection jobs. Further, erecting scaffolding may not be practical or feasible to access some portions of the assets, at least by human operators.

Accordingly, in example embodiments, articulated magnet-bearing legs provide drones with a technical solution to such technical problems by allowing the drones to magnetically land or perch on the assets to perform inspection and maintenance as well as to save battery energy. In further detail, this landing or perching capability enables UAV's to preserve power by landing on pipes instead of hovering during missions that require long time such as surveillance or monitoring for gas leaks. In addition, the capability enables UAV's to perform jobs that require contact with the pipe such as inspection (e.g., ultrasonic, magnetic) or light maintenance (e.g., coating). Further, the capability enables UAV's to deliver payloads to the pipe, such as small sensing devices and crawlers, or to retrieve samples such as corrosion coupons. In further detail, example embodiments provide for a UAV landing or perching mechanism that tolerates various pipe diameters and misalignments due to imperfect landings. Example embodiments further provide for UAV landing legs that are as light as possible since payload weight is an important restriction of most UAV's.

Figure 1B:
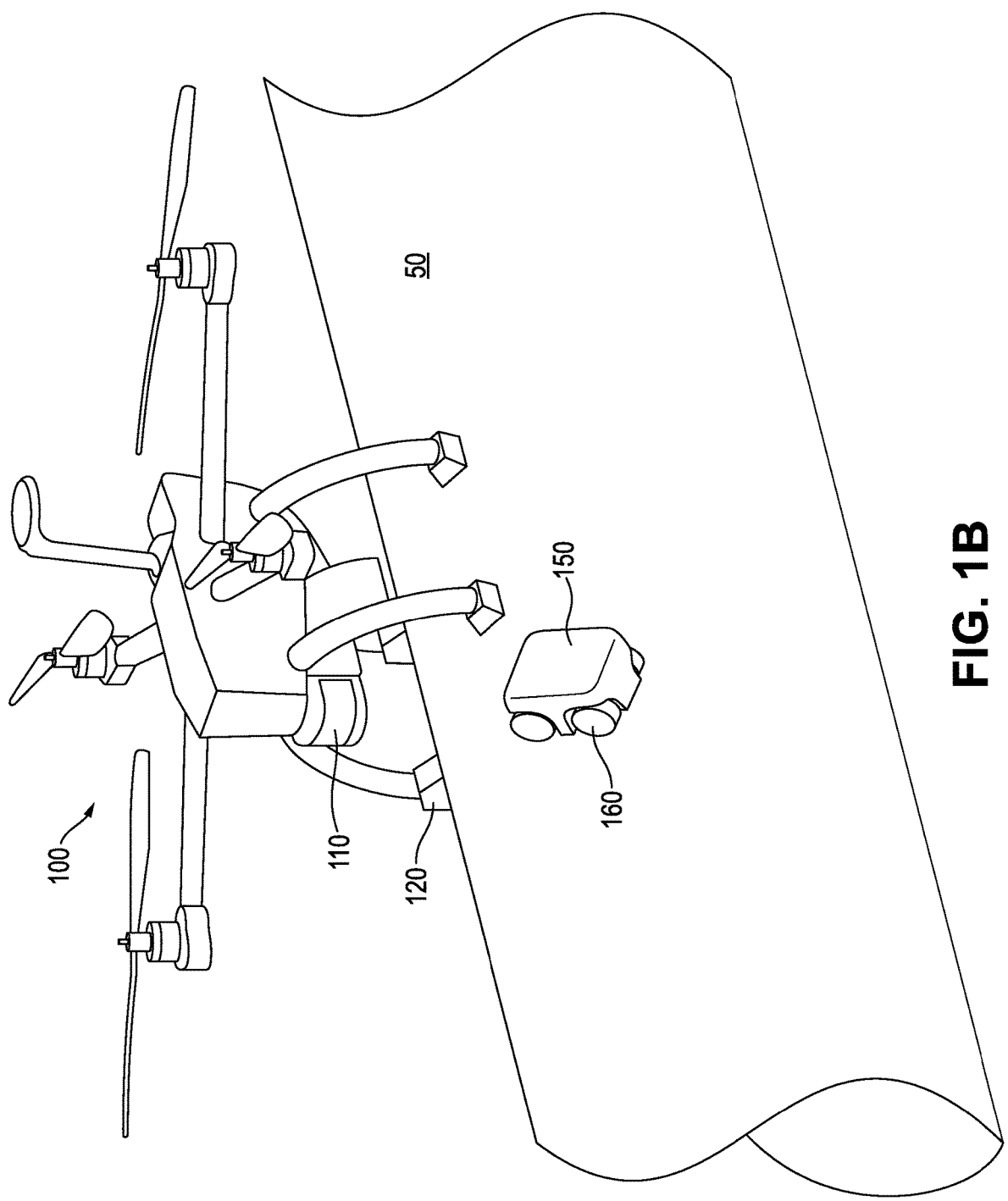

FIGS. 1A and 1B are illustrations of an example UAV 100 perching on a structure 50 (e.g., pipe), with the UAV 100 having a releasable crawler 150 for inspecting or maintaining the structure 50, according to an embodiment. The crawler 150 is shown attached to the UAV 100 in FIG. 1A and not attached to the UAV 100 (e.g., crawling on the structure 50) in FIG. 1B. For ease of description, it is assumed throughout that the structure 50 is larger (such as significantly larger) than the UAV 100. For example, the structure 50 is larger in every dimension than the UAV 100, or the structure 50 presents a larger footprint on which to land than the footprint of the UAV 100.

FIGS. 1A and 1B show the mother-child configuration in action. FIG. 1A shows the UAV 100 after landing on the pipe 50 with the crawler 150 still docked in it. FIG. 1B shows the crawler 150 after being released from the UAV 100 to perform the inspection job. The crawling capability provided by the releasable crawler 150 gives the UAV 100 important features for inspection and maintenance jobs, such as easier accessibility (e.g., landing does not have to be on the exact spot where inspection or maintenance takes place). The crawling further provides for circumferential and longitudinal scans. For instance, in the oil and gas industry, it is important to perform full scans of the pipe 50 to find the minimum steel thickness on a certain area of the pipe 50. Such scans often include circumferential scans and longitudinal scans, for which crawling is well suited. The crawling further provides for power efficiency during multiple inspections (e.g., crawling between multiple inspection sites on the same pipe is more power efficient than flying).

In FIGS. 1A and 2B, the UAV 100 utilizes four articulated magnets 120 (such as permanent magnets or switchable permanent magnets). To accommodate the landing of the UAV 100 on the pipe 50, each of the magnets 120 (or more precisely, its magnetic field) articulates with a perpendicular orientation with respect to the pipe 50 when the UAV has landed or is perching on the pipe 50.

In some embodiments, the magnetic fields of the articulated magnets 120 are actively switchable on and off (e.g., to allow for easy detachment after job completion). A laser scanner 110 (e.g., light detection and ranging, or LIDAR) is included in order to measure, for example, the pipe's relative location with respect to the UAV during the automated landing maneuver as a form of real-time feedback. The miniature crawler 150 is connected by a wire (e.g., for power and communication) and includes a UT sensor, four magnetic wheels 160, and two motors to drive the wheels 160 in corresponding pairs (e.g., front and rear). The wire also allows the rest of the electronics and batteries for carrying out the inspection or maintenance to be located in the main UAV body 100. This reduces the size, weight, and complexity of the crawler 150. In some other embodiments, the crawler 150 is designed with other configurations in terms of number of wheels (two or three wheels are also conceivable) and their type (e.g., omniwheels, mecanum wheels, to name a few).

In some embodiments, communication between the crawler 150 and the UAV 100 is wired. For example, using a small spool of a thin cord, the crawler 150 can be connected to the UAV 100 for power and communication. This can eliminate, for example, the need to host a battery and other electronics inside the crawler 150, making it smaller and saving total weight by utilizing some of the components already existing in the UAV 100.

In some other embodiments, communication between the crawler 150 and the UAV 100 is wireless. Here, the crawler 150 includes its own battery and electronics, to provide for a more standalone vehicle. This can be useful, for example, when the UAV 100 picks up the crawler 150 from the ground and deploys it on the pipe 50, at which point the UAV 100 can fly to do some other inspection jobs and then go back to pick the crawler 150 up. This can also be useful for numerous crawlers 150 (e.g., a swarm of crawlers 150) to inspect multiple assets, with the UAV 100 working on picking them up one-by-one or in batches from the ground towards their destination and retrieving them upon job completion. In different embodiments, the wireless connection can be between the crawler(s) 150 and either the UAV 100 or an operator's control station, or both the UAV 100 and the operator's control station.

In different embodiments, different landing mechanisms of the UAV 100 can be used. These can include different types of adhesion mechanisms such as magnetic or non-magnetic. Examples of magnetic landing mechanisms include magnets that can be shut-off or overcome by a mechanical means during takeoff from the pipe 50. Such magnets include switchable permanent magnets, permanent magnets with an actuated leverage to aid in detachment during takeoff, electro permanent magnets, and electromagnets. It should be noted, however, that continuous power consumption can be a disadvantage for electromagnets. Non-magnetic adhesion mechanisms can be used for non-ferromagnetic surfaces such as stainless steel, composite pipes, and concrete walls. Such mechanisms include microspines, dry gecko-inspired adhesives (e.g., synthetic setae), suction cups, grippers, and claws.

In different embodiments, different crawler payloads or designs are used. For simplicity, these payloads or designs fall into two basic categories: inspection and maintenance. Inspection payloads and designs include a range of different types of sensors that are often used in the oil and gas industry to inspect pipes and structures. For example, in some embodiments, a UT sensor is used for thickness measurement. For ease of description, a UT sensor for thickness measurement is used throughout at times to represent an example device and application for inspection and maintenance. However, other embodiments are not limited to such a device or application. For instance, other inspection sensors can be used instead of or in addition to the UT sensor depending on the job, including (but not limited to) eddy current sensors and alternating current field measurement (ACFM) sensors.

In still other embodiments, the crawler is used for maintenance purposes. For example: the crawler can be used to perform light maintenance jobs such as cleaning, surface preparation, and coating repairs. In still yet other embodiments, the crawler is used for visual inspection. For instance, in some embodiments, a camera is used for simple visual inspection jobs, such as where only videos or photos of areas of interest need to be obtained, but for which the areas are difficult to inspect directly by the UAV.

FIGS. 2A and 2B are profile and exploded views, respectively, of an example passively articulated magnet-bearing leg 200 for landing a UAV on a curved ferromagnetic surface (such as a pipe), according to an embodiment. While the articulated leg 200 of FIGS. 2A and 2B uses permanent magnets 230 to make the leg 200 be magnetic, other embodiments are not so limited. For example, in other embodiments, other magnets such as electromagnets, electro-permanent magnets, or switchable magnets are used, such as to simplify the design or reduce weight. Many of these other embodiments are described later. In addition, for ease of description, a pipe is used throughout as an example structure having a curved ferromagnetic surface. However, the described embodiments are equally applicable to other such structures, such as cylindrical or spherical storage tanks, having curved ferromagnetic surfaces. In addition, it should be noted that in some of these embodiments, the UAV also has a releasable crawler, while in some others of these embodiments, the UAV does not have a releasable crawler.

Referring to FIGS. 2A and 2B, the perching mechanism for a UAV is based on four identical magnetic landing legs 200. For example, the legs 200 can be designed, three dimensionally (3D) printed, assembled, and mounted on a small UAV. In some embodiments, the UAV is a simple remotely-controlled drone that is manually flown to evaluate the perching system efficacy. Four legs 200, for example, provides a corresponding leg for each rotor (rotational blade or propeller) of a four-rotor drone, which is a common number of rotors for UAV's. However, other embodiments are not so limited, and can include different numbers of legs, such as two, three, or six. For example, a three-leg design works as well. Moreover, in other embodiments, there does not need to be any correspondence between the legs and the rotors.

In the four-leg UAV, approaching and landing close to the top of the pipe (e.g., 12 o'clock or near 12 o'clock position) with a straight or near straight angle is desirable, and usually provides for adhesion and proper perching of all four legs. Nevertheless, attempting to land the four-leg UAV at an inclined angle (from vertical) will often lead to adhesion of only three legs while the fourth leg floats in the air. However, this can still lead to acceptable perching and adhesion.

The legs 200 have features needed for successful perching and adhesion to the pipe. For instance, each leg 200 in the perching mechanism features a passive articulation joint 250 (or universal joint), such as cross shaft 252 for coupling two orthogonal shaft screws 254 and four corresponding bushings 256 using two corresponding nuts 258 to provide two rotational degrees of freedom between a main body 210 (e.g., upper portion) and a magnet holder 220 (e.g., lower portion or foot) of the articulated leg 200. The articulation of the leg 200 is passive in that the articulation joint 250 is designed to articulate in response to the magnetic attraction of the magnets 230 and the ferromagnetic surface when the UAV is in close proximity to the target ferromagnetic surface.

To accommodate the landing of the UAV on the pipe, each of the articulated legs 200 (or more particularly, the magnet holders 220, specifically the magnetic fields of their corresponding magnets) articulates with a perpendicular orientation with respect to the pipe (or other curved surface) when the UAV has landed or is perched on the pipe. In the magnet holder 220, three magnet holes 240 house up to a corresponding three cylindrical permanent magnets 230 that provide sufficient adhesion to the pipe during landing or perching. It should be noted that the number, size, and shape of the magnets 230 are but examples, and other embodiments are not so limited. In an example embodiment, each leg 200 uses a lightweight design where each leg 200 weighs only 30 grams (g). The design of the leg 200 of FIGS. 2A and 2B allows for fine tuning of the magnetic pull force such that it is strong enough to stick to the surface during landing and not too strong to cause any damage due to strong impact with the pipe.

Figure 3:
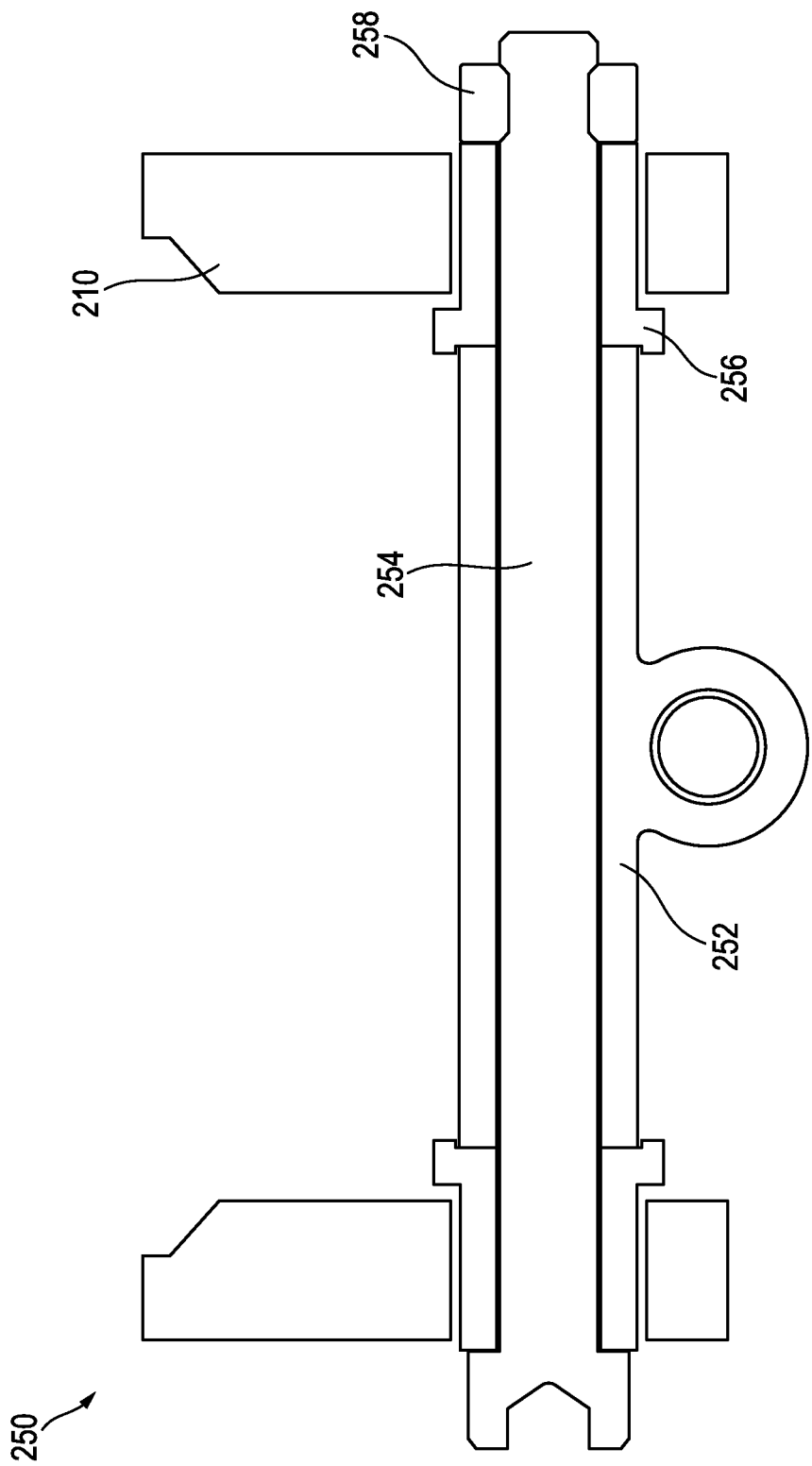
FIG. 3 is a cross-sectional view of an example universal joint for the articulated leg of FIGS. 2A and 2B, according to an embodiment.

FIG. 3 is a cross-sectional view of the example universal joint (such as the passive articulation joint 250) for the articulated leg 200 of FIGS. 2A and 2B, according to an embodiment.

Each leg 200 is designed with an embedded universal joint 250 that breaks the leg 200 into two distinct parts, a main body 210 rigidly mounted to the drone and a moving magnet holder 220. The universal joint 250 provides the magnet holder 220 with two rotational degrees of freedom, which allow the magnets 230 to passively realign their orientation (e.g., perpendicular) toward the pipe for perfect or near perfect adhesion. The universal joint 250 is an embedded and integral part of the leg 200. For example, the universal joint 250 (or parts thereof) can be fabricated using 3D printing. FIG. 3 shows a cross of the joint 250 illustrating its various parts, including a cross shaft 252, shaft screws 254, corresponding bushings 256, and corresponding nuts 258 for mechanically coupling the main body 210 to the magnet holder 220. As such, the cross shaft 252, shaft screws 254, bushings 256, and nuts 258 function as a rotor of the articulated leg 200 while the main body 210 functions as a stator.

Figure 4B:
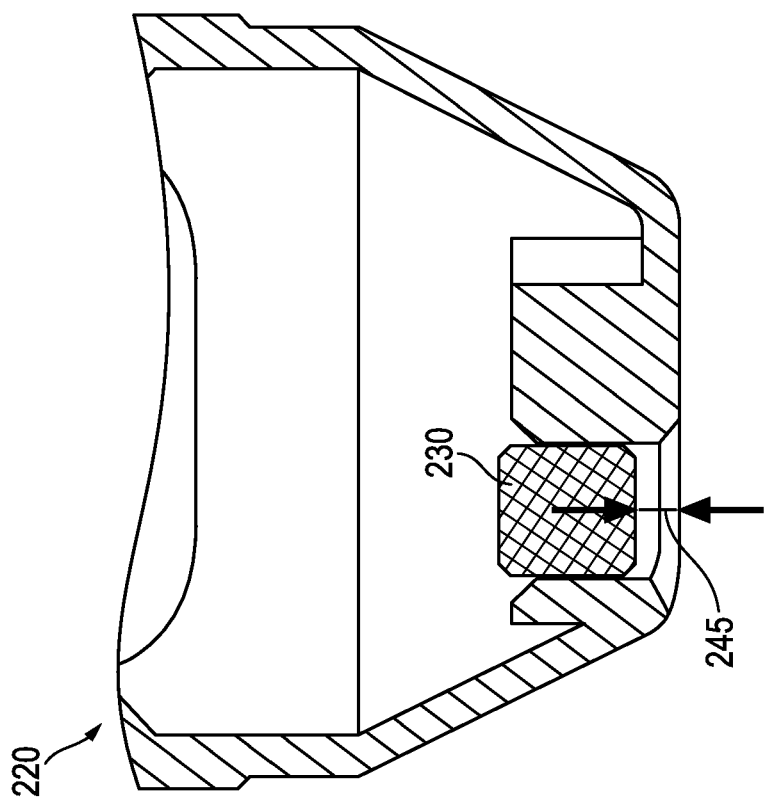
FIGS. 4A and 4B are views of example techniques to adjust the magnetic strength of the magnetic end of a magnet holder (lower portion or foot) of the articulated leg of FIGS. 2A and 2B, according to embodiments.
Figure 4A:
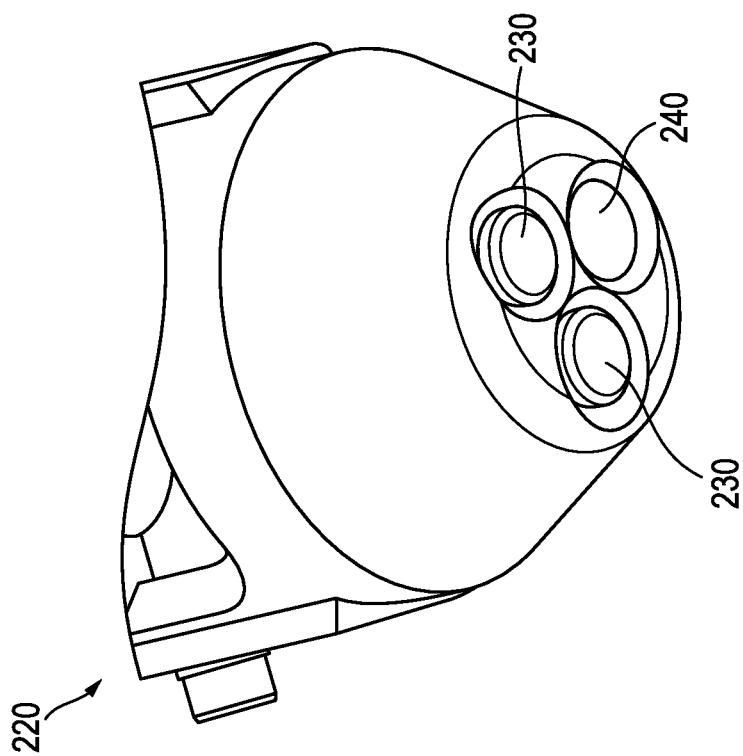

FIGS. 4A and 4B are views of example techniques to adjust the magnetic strength of the magnetic end of the magnet holder 220 (lower portion or foot) of the articulated leg 200 of FIGS. 2A and 2B, according to embodiments.

In the magnet holder 220, up to three permanent magnets 230 can be installed in each leg 200. Each cylindrical magnet 230 is, for example, ¼ inch in diameter and length. The design provides flexibility in tuning the desired magnetic pull force, such as reducing the magnetic pull from a maximum or default configuration including three such magnets 230 extending to or out of the magnet holes 240 (e.g., to make direct contact with the ferromagnetic surface). This maximum magnetic pull can be reduced, for example, by reducing the number of magnets 230 (such as from three to two, as shown in FIG. 4A, which also reduces the weight of the magnet holder 220). Another way to reduce the maximum magnetic pull is to leave an adjustable gap 245 between the one or more magnets 230 and the bottom of the magnet holder 220 (as shown in FIG. 4B), to increase the distance between the magnets 230 and the ferromagnetic surface. The magnets 230 are held in place, for example, by forming the magnet end 220 out of plastic and press-fitting the magnets 230 into the plastic body of the leg 200.

In other embodiments, the number of permanent magnets 230 can vary from three (e.g., one, two, four, or more). In addition, the two degrees of freedom in each leg 200 were achieved using a universal joint in FIGS. 2A through 4B, but this design can vary in other embodiments. For example, in other embodiments, other types of couplings can be used to achieve these two degrees of freedom, such as a ball joint. Two degrees of freedom permits the leg orientation (in particular, the foot orientation) to conform to the curved landing surface.

FIGS. 5A, 5B, and 5C are views of an example switchable magnet 530 for use with a passively articulated magnet-bearing leg for landing or perching a UAV on a ferromagnetic surface 450, according to an embodiment. This is a modification of the embodiment of articulated leg 200 of FIGS. 2A through 4B and uses switchable magnets 530 instead of permanent magnets 230. The switchable magnets 530 can be selectively turned on or off. This facilitates easy detachment during take-off from the pipe by switching the magnet off. It should be noted that the example dimensions provided in FIG. 5A can be varied in other embodiments.

As illustrated in FIG. 5A, one way to fabricate the switchable magnet 530 is to use two disk magnets on top of each other, one of which is static (e.g., fixed magnet 534) and the other of which can be rotated (e.g., moving magnet 532). The magnets are housed in a magnetic flux concentrator, such as an iron housing 536. The rotatable magnet 532 can be oriented to cancel the magnetic field of the fixed magnet 534 (as illustrated in FIG. 5B), turning the total magnet 530 off. Alternatively, the rotatable magnet 532 can be oriented in the same direction as the fixed magnet 534 to intensify its field (as illustrated in FIG. 5C), turning the total magnet 530 on. The rotation of the moving magnet 532 can be performed, for example, using an actuator such as a motor.

FIG. 6A is an exploded view of an example passively articulated leg 600 having a switchable magnet 630, while FIG. 6B is an enlarged view of the switchable magnet 630 of FIG. 6A, according to an embodiment.

The embodiment of FIGS. 6A and 6B uses a switchable magnet 630 in a magnet holder 620 of each landing leg 600. The switchable magnet 630 is operated using an actuator 638 (such as a servo motor to switch the magnet's state. When approaching the landing target (e.g., pipe), the magnets 630 are switched on using a signal sent from an onboard controller of the UAV to the motor 638 to allow the UAV to stick to the pipe. When the time comes to take off, the magnets 630 are switched off to make the UAV propellers' job easier and avoid the need to overcome the magnetic pull force. FIG. 6A shows an exploded view of landing leg 600 containing a switchable magnet 630 housed in magnet holder 620. The other components of FIG. 6A are substantially similar to the same-numbered components of FIG. 2B, and their descriptions will not be repeated.

FIG. 6B shows an example switchable magnet 630 for the articulated leg 600. The magnet 630 includes a rotating permanent magnet 632 that rotates with respect to a fixed permanent magnet 634 to switch the magnet 630 on and off. Motor or actuator 638 performs the rotation of the rotating magnet 632 with respect to the fixed magnet 634 to cancel out or combine the magnetic power of the two magnets 632 and 634. An iron flux concentrator 636 houses the two magnets 632 and 634 and helps direct or spread their combined magnetic force to a ferromagnetic surface below the leg 600.

Figure 7:
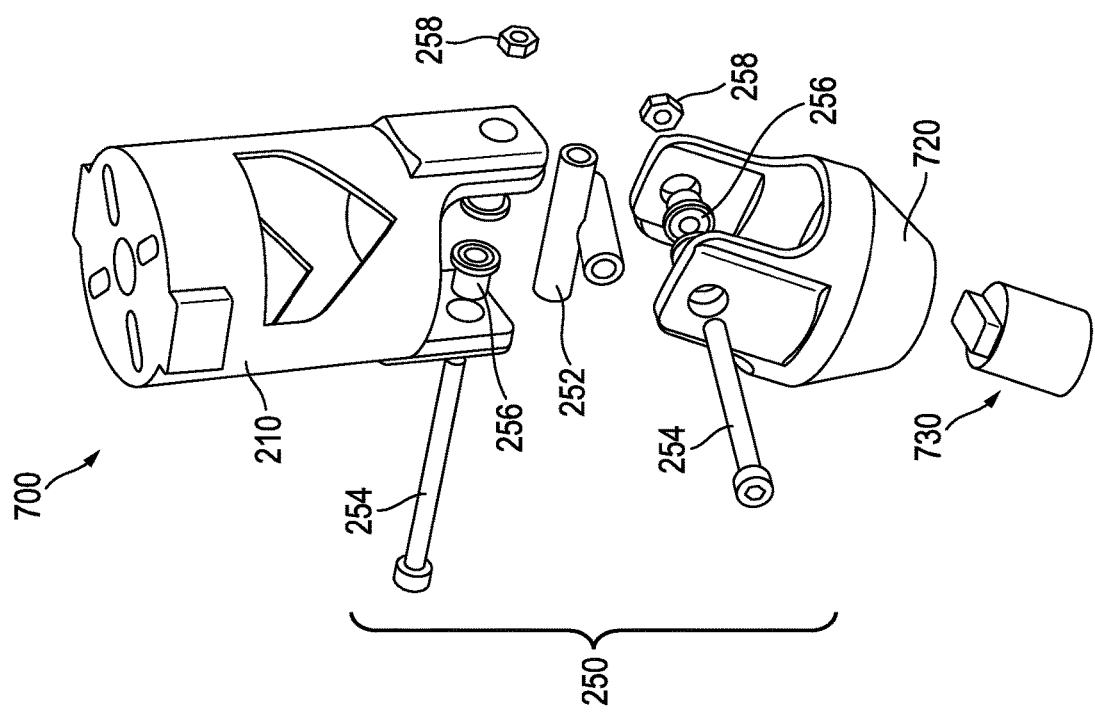
FIG. 7 is an exploded view of an example passively articulated leg having an electro-permanent magnet, according to an embodiment.

FIG. 7 is an exploded view of an example passively articulated leg 700 having an electro-permanent magnet 730 housed in a magnet holder 720, according to an embodiment. The other components of leg 700 are substantially similar to the same-numbered components of legs 200 and 600 of FIGS. 2B and 6A, respectively. That is, leg 700 can have substantially the same passively articulated legs with two degrees of freedom (universal joint) as legs 200 and 600, but utilizes an electro-permanent magnet 730 instead of a permanent magnet 230 or a switchable magnet 630.

Electro-permanent magnets, such as electro-permanent magnet 730, differ significantly from regular electro-magnets, which may not be suitable for this type of application. This is because regular electro-magnets require a constant electrical current to keep their coils magnetized, which can quickly deplete the UAV's battery while it is perched on the pipe. On the other hand, electro-permanent magnets (such as electro-permanent magnet 730) stay on without requiring electrical power and only need an electrical pulse to switch between the on state and the off state. Not needing power when on or off and only requiring power to transition between on and off is an attractive benefit of electro-permanent magnets for this type of application.

The embodiment of FIG. 7 utilizes an electro-permanent magnet 730 in each landing leg 700. When approaching the landing target (e.g., pipe), the magnets 730 are switched on using a signal sent from the UAV controller to the magnets to allow the UAV to stick to the pipe. When the time comes to take off, the magnets are switched off to make the propellers' job easier and avoid the need to overcome the magnetic pull force.

Figure 8:
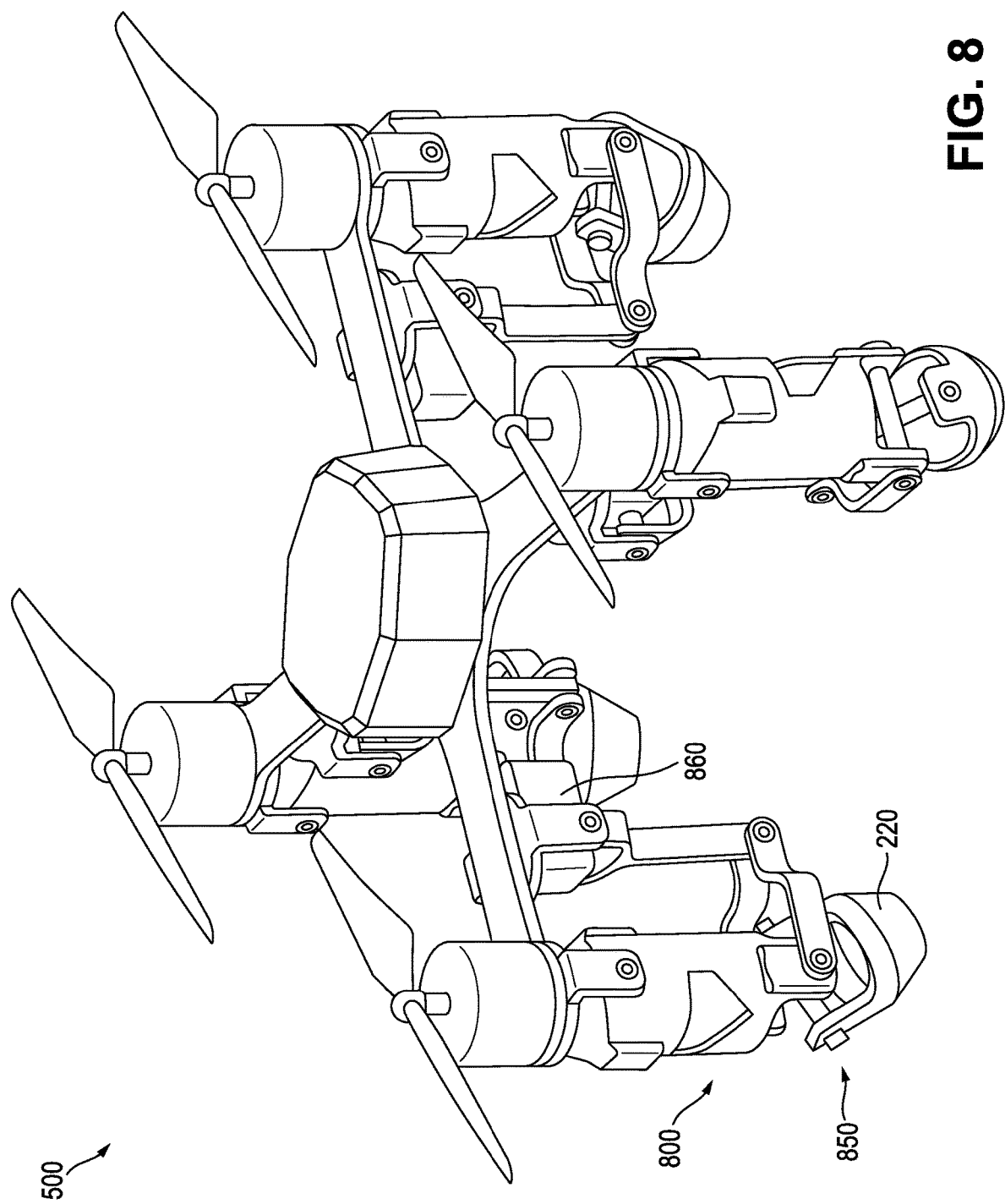
FIG. 8 is an illustration of an example UAV having passively articulated legs and corresponding detachment motors, according to an embodiment.

FIG. 8 is an illustration of an example UAV 500 having passively articulated legs 800 and corresponding detachment motors 860, according to an embodiment.

Regarding the UAV 500 of FIG. 8, it is noted that detaching magnets from a ferromagnetic surface is easier by tipping the magnets rather than pulling them directly away from the magnetic attraction. This is because tipping a magnet creates a moment arm that amplifies the detaching force. In further detail, detachment by directly pulling a magnet away from a ferromagnetic surface requires a force at least equal to the magnetic force. On the other hand, detachment by tipping applies a lateral force to the top (or upper portion) of the magnet, which applies a torque around the bottom corner of the magnet, around which rotation will occur. When the applied detaching force (tipping force) has a bigger moment arm and provides a stronger torque than that of the magnetic force, the magnet detaches. This is usually a much smaller force than the magnetic force required to directly pull the magnet away. As such, it is significantly easier to detach the magnet by tipping than by pulling.

With this in mind, each passively articulated leg 800 of the UAV 500 includes a corresponding detachment motor 860 to apply a tipping force to the magnet holder 820 (lower end) of the articulated leg 800 at the universal joint 850. Applying the force at the universal joint 850 maximizes torque on the magnet holder 220 to break away from the ferromagnetic surface on which the UAV 500 has landed or perched.

Figure 9A:
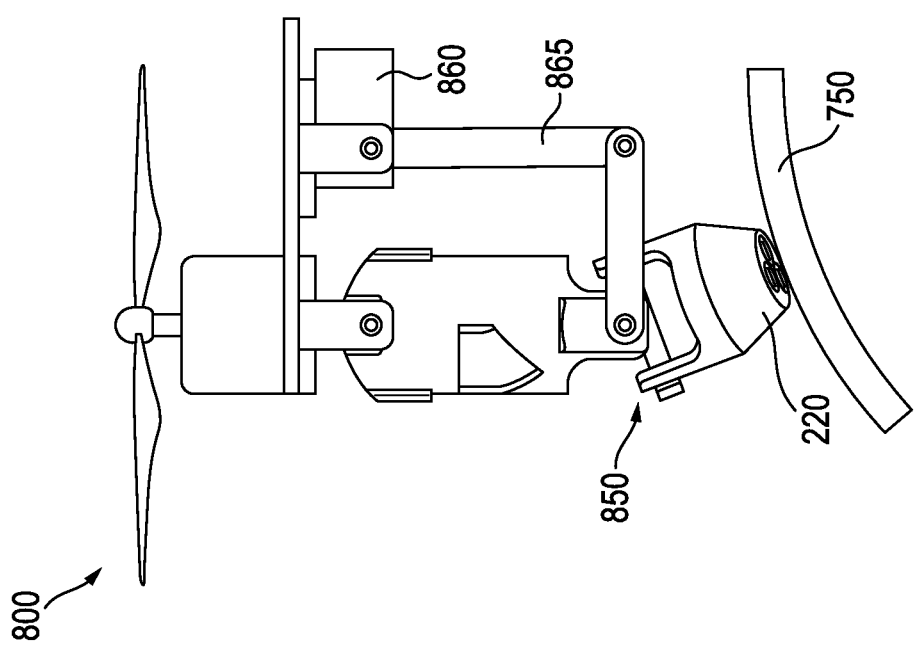
FIGS. 9A and 9B are side views of an articulated leg and detachment motor of the UAV of FIG. 8, illustrating the leg in attached and detached positions, respectively, with respect to a curved ferromagnetic surface.
Figure 9B:
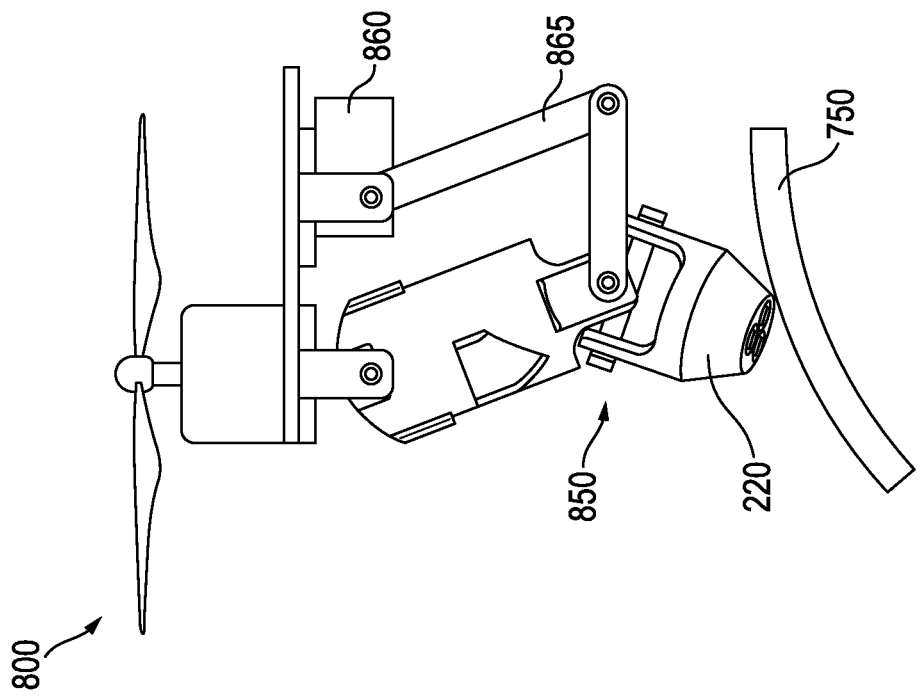

FIGS. 9A and 9B are side views of the articulated leg 800 and detachment motor 860 of the UAV of FIG. 8, illustrating the leg 800 in attached and detached positions, respectively, with respect to a curved ferromagnetic surface 750.

The articulated leg 800 is similar to the articulated leg 200 described earlier, only it embeds a detachment motor or actuator 860 into the leg 800 to tip the magnet holder 220 from the universal joint 850. Aside from the detachment motor 860 and its connection to the universal joint 850, the articulated leg 800 is similar to the articulated leg 200, such as using permanent magnets for perching. Each of the four legs 800 has its own motor 860 that is linked using a four-bar linkage 865. The magnet holders 220 are passive and move freely with two degrees of freedom using the universal joint 850 similarly to the articulated leg 200. FIG. 9A shows the leg 800 magnetically attached to the pipe 750 while the magnet holder 220 (or "foot") passively orients itself towards the pipe 750 since the magnets of the magnet holder 220 are attracted to the pipe 750. When it is time to perform detachment and takeoff, the motor 860 is actuated as shown in FIG. 9B and the leg 800 is tipped at the universal joint 850 through the detachment motor linkage 865, leading to easy detachment. It should be noted that the motor 860 should be self-locking so that when the motor 860 is powered off, the four-bar linkage 865 is locked and does not move.

In one embodiment, the detachment motors 860 are also used to aid in attachment to the curved ferromagnetic surface 750 by adjusting the spacing between the legs 800 for various surface curvatures (e.g., pipe diameters). For example, as part of approaching the curved ferromagnetic surface 750, the onboard controller on the UAV 500 can be programmed or otherwise configured to use a sensor (e.g., LIDAR, as in laser scanner 110) to detect the curvature of the ferromagnetic surface 750, and use the detachment motors 860 to separate the legs 800 appropriately (e.g., further apart for small curvature, closer together for large curvature) prior to attachment.

Figure 10:
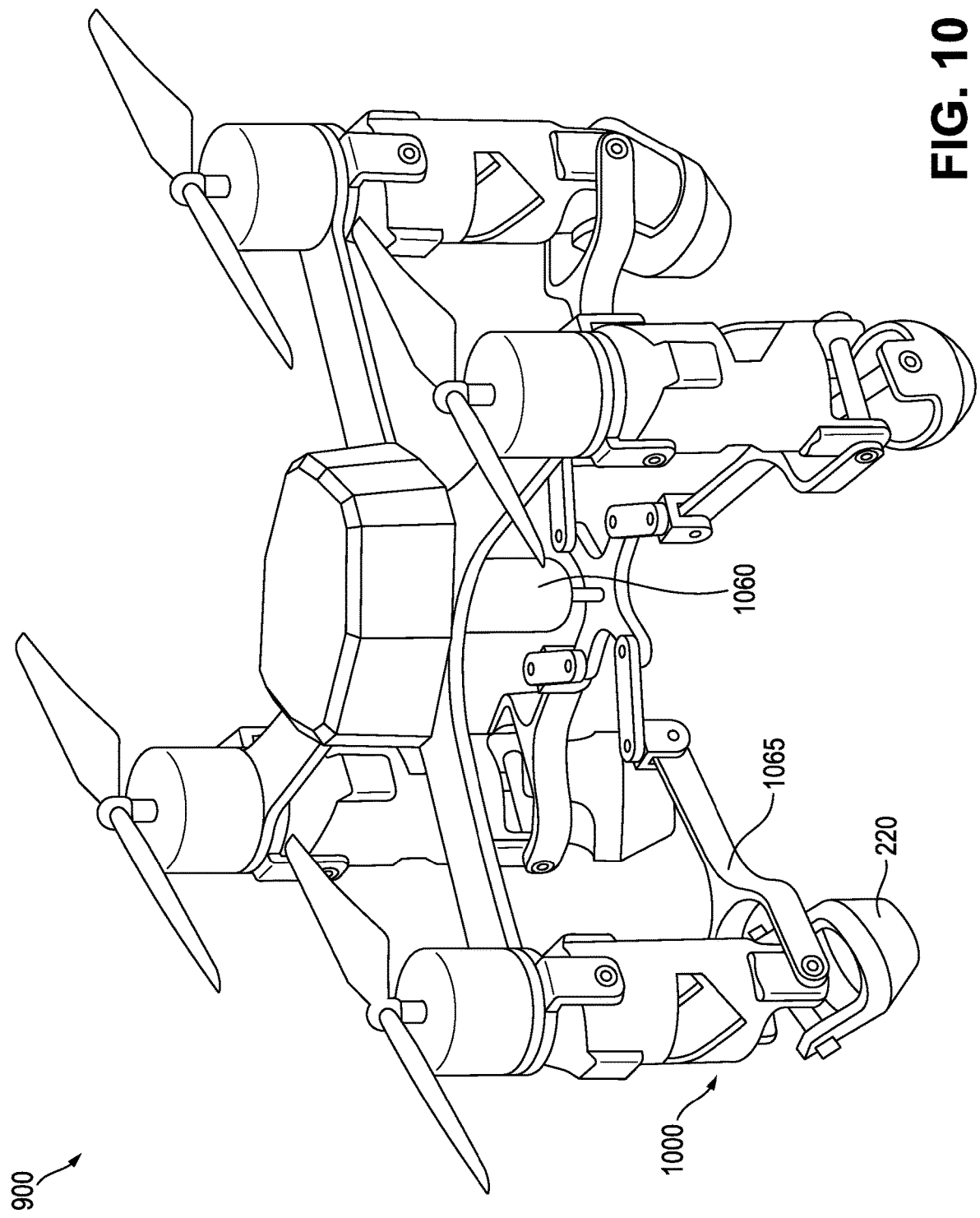
FIG. 10 is an illustration of an example UAV having passively articulated legs and a unified detachment motor, according to an embodiment.

FIG. 10 is an illustration of an example UAV 900 having passively articulated legs 1000 and a unified detachment motor 1060, according to an embodiment. The UAV 900 is similar to the UAV 500 of FIG. 8, only uses the unified detachment motor 1060 (shared among all four articulated legs 1000) in place of the dedicated detachment motors 860 for each articulated leg 800.

The embodiment of FIG. 10 builds on the idea of the embodiment of FIG. 8, but instead of using one motor 860 for each leg 800, a single actuator 1060 is used to detach all legs 1000 at once. This design reduces weight and size by eliminating the need for multiple detachment motors. The mechanical linkage 1065 connects all the legs 1000 to the central motor 1060 that, when rotated, pulls all the legs 1000 inward, leading to detachment. It should be noted that in other embodiments, other mechanical linkage designs can be used to link the legs 1000 to a single actuator, which can be a linear actuator instead of a motor.

Figure 11B:
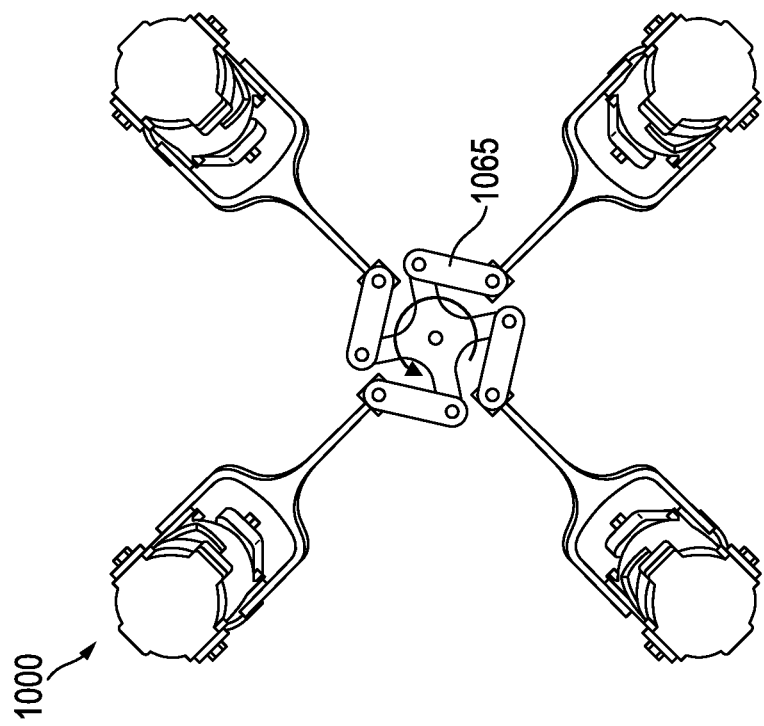
FIGS. 11A and 11B are top views of the UAV of FIG. 10, illustrating the legs in attached and detached positions, respectively.
Figure 11A:
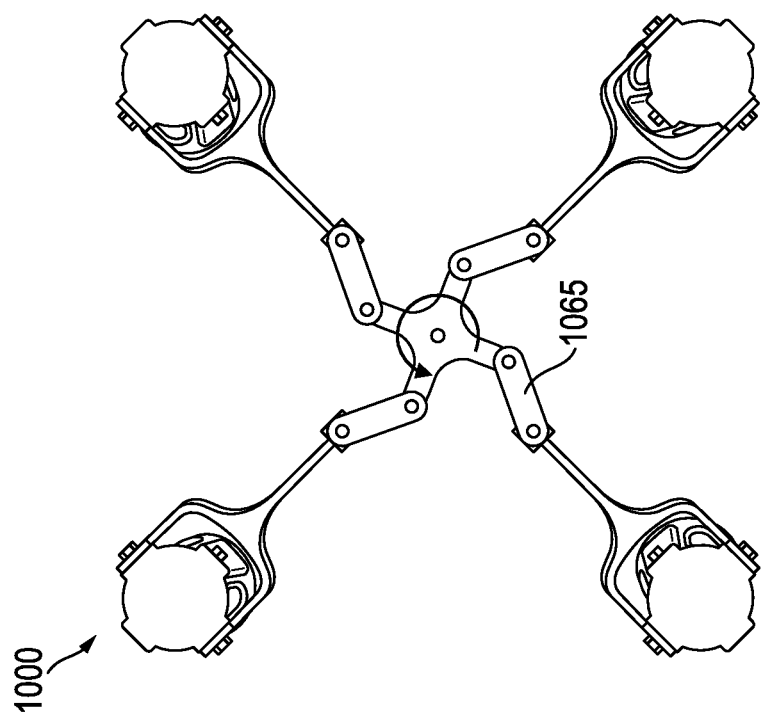

FIGS. 11A and 11B are top views of the UAV 900 of FIG. 10, illustrating the legs 1000 in attached and detached positions, respectively. FIGS. 12A and 12B are side views of an articulated leg 1000 of the UAV 900 of FIG. 10, illustrating the leg 1000 in attached and detached positions, respectively, with respect to a curved ferromagnetic surface 750. These drawings help illustrate how the single actuator 1060 of UAV 900 works.

FIGS. 11A and 12A illustrate the configuration of legs 1000 during landing, where the legs 1000 point down and the magnets orient themselves passively towards the pipe 750 for proper attachment. When it is time to detach and take off, the central detachment motor 1060 turns counterclockwise, which pulls the legs 1000 inward using the mechanical linkage 1065, as illustrated in FIGS. 11B and 12B. This applies a tipping force on the top of the magnetic feet 220, forcing them to detach from the pipe 750. The motor 1060 should be self-locking to prevent unintentional detachment when the motor 1060 is unpowered.

As with the UAV 500 in FIG. 8, in one embodiment, the UAV 900 in FIG. 10 uses the detachment motor 1060 as well to aid in attaching to the curved ferromagnetic surface 750 by adjusting the spacing between the legs 1000 for various surface curvatures (e.g., pipe diameters). For example, as part of approaching the curved ferromagnetic surface 750, the onboard controller on the UAV 900 can be programmed or otherwise configured to use a sensor (e.g., LIDAR, as in laser scanner 110) to detect the curvature of the ferromagnetic surface 750, and use the detachment motor 1060 to separate the legs 1000 appropriately (e.g., further apart for small curvature, closer together for large curvature) prior to attachment.

Figure 13:
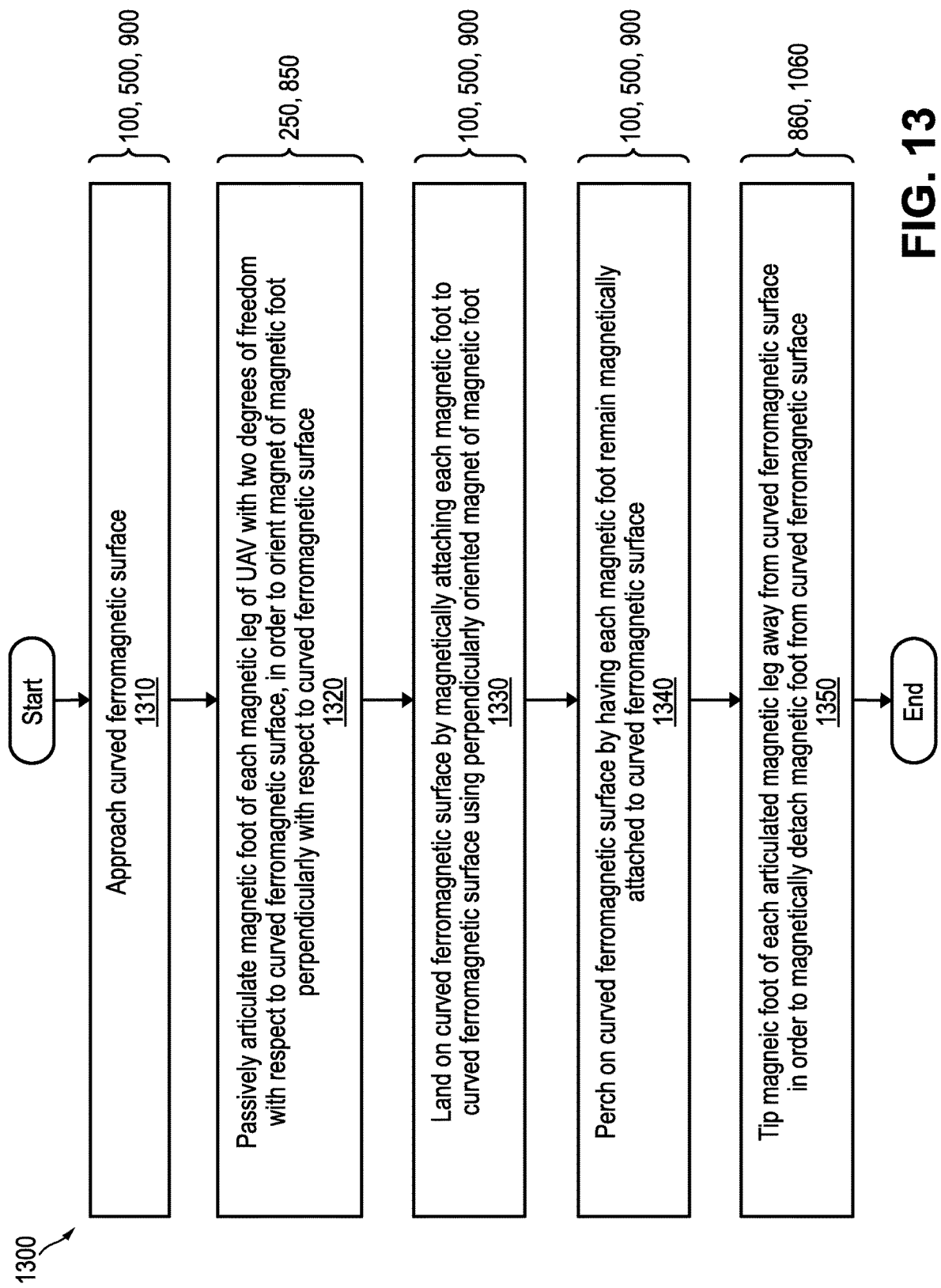
FIG. 13 is a flow chart of an example method of landing a UAV having articulated magnet-bearing legs on a curved ferromagnetic surface, according to an embodiment.

FIG. 13 is a flow chart of an example method 1300 of landing a UAV (such as UAV 100, 500, or 900) having articulated magnet-bearing legs (such as articulated legs 120, 200, 600, 700, 800, or 1000) on a curved ferromagnetic surface (such as pipe 50 or curved ferromagnetic surface 750), according to an embodiment.

Some or all of the method 1300 can be performed using components and techniques illustrated in FIGS. 1 through 12B. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 900 (or other disclosed method) to be carried out. It should be noted that in other embodiments, the order of the operations can be varied, and that some of the operations can be omitted. Some or all of the method 1300 can also be performed using logic, circuits, or processors located on a UAV configured to carry out the method 1300.

In the example method 1300, processing begins with the step of approaching 1310 the curved ferromagnetic surface with the UAV. The method 1300 further includes the step of articulating 1320 a magnetic foot (such as magnet holder 220, 620, or 720) of each articulated leg to orient a magnet (such as permanent magnets 230, switchable magnet 530 or 630, or electro-permanent magnet 730) of the magnetic foot perpendicularly with respect to the curved ferromagnetic surface. By way of example, the step of articulating 1320 can include the step of passively articulating 1320 the magnetic foot with two degrees of freedom with respect to the curved ferromagnetic surface using a passive articulation joint (such as universal joint 250 or 850) coupling a main body (such as main body 210) of the articulated leg to the magnetic foot.

The method 1300 further includes the step of landing 1330 the UAV on the curved ferromagnetic surface by magnetically attaching each magnetic foot to the curved ferromagnetic surface using the perpendicularly oriented magnet of the magnetic foot. The method 1300 further includes the step of perching 1340 the UAV on the curved ferromagnetic surface after the step of landing 1330 by having each magnetic foot remain magnetically attached to the curved ferromagnetic surface. The method 1300 further includes the step of tipping 1350 the magnetic foot of each articulated leg away from the curved ferromagnetic surface using a detachment motor (such as detachment motor 860 or 1060) in order to magnetically detach the magnetic foot from the curved ferromagnetic surface.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) for landing and perching on a curved ferromagnetic surface, the UAV including a plurality of articulated legs, each articulated leg comprising:
   a main body attaching the articulated leg to the UAV;
   a magnet configured to magnetically attach to the curved ferromagnetic surface;
   a magnetic foot for housing the magnet and configured to magnetically articulate towards and attach to the curved ferromagnetic surface using the magnet in a perpendicular orientation with respect to the curved ferromagnetic surface in response to the UAV approaching the curved ferromagnetic surface in order to land the UAV on the curved ferromagnetic surface and for the UAV to perch on the curved ferromagnetic surface after the landing;
   a passive articulation joint coupling the main body to the magnetic foot and configured to passively articulate the magnetic foot with two degrees of freedom with respect to the curved ferromagnetic surface; and
   a detachment motor configured to magnetically detach the magnetic foot from the curved ferromagnetic surface by tipping the magnetic foot away from the curved ferromagnetic surface,
   wherein the magnetic foot is further configured to remain magnetically attached to the curved ferromagnetic surface while the UAV is perched on the curved ferromagnetic surface.

2. The UAV of claim 1, wherein the plurality of articulated legs comprises four articulated legs.

3. An unmanned aerial vehicle (UAV) for landing and perching on a curved ferromagnetic surface, the UAV including a single detachment motor and a plurality of articulated legs, each articulated leg comprising:
   a main body attaching the articulated leg to the UAV;
   a magnet configured to magnetically attach to the curved ferromagnetic surface;
   a magnetic foot for housing the magnet and configured to magnetically articulate towards and attach to the curved ferromagnetic surface using the magnet in a perpendicular orientation with respect to the curved ferromagnetic surface in response to the UAV approaching the curved ferromagnetic surface in order to land the UAV on the curved ferromagnetic surface and for the UAV to perch on the curved ferromagnetic surface after the landing, the magnetic foot being further configured to remain magnetically attached to the curved ferromagnetic surface while the UAV is perched on the curved ferromagnetic surface; and a passive articulation joint coupling the main body to the magnetic foot and configured to passively articulate the magnetic foot with two degrees of freedom with respect to the curved ferromagnetic surface, wherein the single detachment motor of the UAV is configured to detach the magnetic feet of all of the articulated legs from the curved ferromagnetic surface by tipping the magnetic feet away from the curved ferromagnetic surface.

4. The UAV of claim 3, wherein the magnet comprises a permanent magnet.

5. The UAV of claim 4, wherein the permanent magnet comprises an adjustable quantity of one or more permanent magnets.

6. The UAV of claim 4, wherein the magnetic foot comprises a magnet housing configured to house the permanent magnet within the magnetic foot at an adjustable distance from the curved ferromagnetic surface when the UAV is perched on the curved ferromagnetic surface.

7. The UAV of claim 3, wherein the magnet comprises a switchable magnet and the magnetic foot comprises a motor or actuator configured to move or actuate internal magnets of the switchable magnet, in order to switch the switchable magnet on and off.

8. The UAV of claim 3, wherein the magnet comprises an electro-permanent magnet configured to switch between on and off in response to a pulse of electric current.

9. The UAV of claim 1, further comprising a controller configured to use the detachment motor of each articulated leg to adjust a separation between the articulated legs prior to landing on the curved ferromagnetic surface.

10. The UAV of claim 3, further comprising a controller configured to use the single detachment motor of the UAV to adjust a separation between the articulated legs prior to landing on the curved ferromagnetic surface.

11. An automated method of landing and perching an unmanned aerial vehicle (UAV) on a curved ferromagnetic surface, the UAV including a plurality of articulated legs, each articulated leg having a main body attaching the articulated leg to the UAV, the method comprising:

approaching the curved ferromagnetic surface with the UAV;

magnetically articulating a magnetic foot of each articulated leg towards the approached curved ferromagnetic surface in order to orient a magnet of the magnetic foot perpendicularly with respect to the curved ferromagnetic surface, comprising passively articulating the magnetic foot with two degrees of freedom with respect to the curved ferromagnetic surface using a passive articulation joint of the articulated leg coupling the main body to the magnetic foot;

landing the UAV on the curved ferromagnetic surface by magnetically attaching each magnetic foot to the curved ferromagnetic surface using the perpendicularly oriented magnet of the magnetic foot;

perching the UAV on the curved ferromagnetic surface after the landing by having each magnetic foot remain magnetically attached to the curved ferromagnetic surface; and magnetically detaching the magnetic foot of each articulated leg from the curved ferromagnetic surface using a detachment motor of the articulated leg to tip the magnetic foot away from the curved ferromagnetic surface.

12. The method of claim 11, wherein the plurality of articulated legs comprises four articulated legs.

13. An automated method of landing and perching an unmanned aerial vehicle (UAV) on a curved ferromagnetic surface, the UAV including a single detachment motor and a plurality of articulated legs, each articulated leg having a main body attaching the articulated leg to the UAV, the method comprising:

approaching the curved ferromagnetic surface with the UAV;

magnetically articulating a magnetic foot of each articulated leg towards the approached curved ferromagnetic surface in order to orient a magnet of the magnetic foot perpendicularly with respect to the curved ferromagnetic surface, comprising passively articulating the magnetic foot with two degrees of freedom with respect to the curved ferromagnetic surface using a passive articulation joint of the articulated leg coupling the main body to the magnetic foot;

landing the UAV on the curved ferromagnetic surface by magnetically attaching each magnetic foot to the curved ferromagnetic surface using the perpendicularly oriented magnet of the magnetic foot;

perching the UAV on the curved ferromagnetic surface after the landing by having each magnetic foot remain magnetically attached to the curved ferromagnetic surface; and magnetically detaching the magnetic feet of all of the articulated legs from the curved ferromagnetic surface using the single detachment motor of the UAV to tip the magnetic feet away from the curved ferromagnetic surface.

14. The method of claim 13, wherein the magnet comprises a permanent magnet.

15. The method of claim 14, wherein the permanent magnet comprises an adjustable quantity of one or more permanent magnets, and the method further comprises adjusting the quantity of the one or more permanent magnets in order to adjust a weight or magnetic strength of the magnetic foot.

16. The method of claim 14, wherein the magnetic foot comprises a magnet housing configured to house the permanent magnet within the magnetic foot at an adjustable distance from the curved ferromagnetic surface when the UAV is perched on the curved ferromagnetic surface, and the method further comprises adjusting a location of the permanent magnet within the magnetic foot in order to adjust a magnetic strength of the magnetic foot.

17. The method of claim 13, wherein the magnet comprises a switchable magnet, and the method further comprises moving or actuating internal magnets of the switchable magnet using a motor or actuator of the magnetic foot in order to switch the switchable magnet on and off.

18. The method of claim 13, wherein the magnet comprises an electro-permanent magnet, and the method further comprises using a pulse of electric current to switch the electro-permanent magnet between on and off.

19. The method of claim 11, further comprising adjusting, by a controller of the UAV, a separation between the articulated legs prior to landing on the curved ferromagnetic surface by using the detachment motor of each articulated leg.

20. The method of claim 13, further comprising adjusting, by a controller of the UAV, a separation between the articulated legs prior to landing on the curved ferromagnetic surface by using the single detachment motor of the UAV.

21. The UAV of claim 1, wherein the magnet comprises a permanent magnet.

22. The UAV of claim 21, wherein the permanent magnet comprises an adjustable quantity of one or more permanent magnets.

23. The UAV of claim 21, wherein the magnetic foot comprises a magnet housing configured to house the permanent magnet within the magnetic foot at an adjustable distance from the curved ferromagnetic surface when the UAV is perched on the curved ferromagnetic surface.

24. The UAV of claim 1, wherein the magnet comprises a switchable magnet and the magnetic foot comprises a motor or actuator configured to move or actuate internal magnets of the switchable magnet, in order to switch the switchable magnet on and off.

25. The UAV of claim 1, wherein the magnet comprises an electro-permanent magnet configured to switch between on and off in response to a pulse of electric current.

26. The UAV of claim 3, wherein the plurality of articulated legs comprises four articulated legs.

27. The method of claim 11, wherein the magnet comprises a permanent magnet.

28. The method of claim 27, wherein the permanent magnet comprises an adjustable quantity of one or more permanent magnets, and the method further comprises adjusting the quantity of the one or more permanent magnets in order to adjust a weight or magnetic strength of the magnetic foot.

29. The method of claim 27, wherein the magnetic foot comprises a magnet housing configured to house the permanent magnet within the magnetic foot at an adjustable distance from the curved ferromagnetic surface when the UAV is perched on the curved ferromagnetic surface, and the method further comprises adjusting a location of the permanent magnet within the magnetic foot in order to adjust a magnetic strength of the magnetic foot.

30. The method of claim 11, wherein the magnet comprises a switchable magnet, and the method further comprises moving or actuating internal magnets of the switchable magnet using a motor or actuator of the magnetic foot in order to switch the switchable magnet on and off.

31. The method of claim 11, wherein the magnet comprises an electro-permanent magnet, and the method further comprises using a pulse of electric current to switch the electro-permanent magnet between on and off.

32. The method of claim 13, wherein the plurality of articulated legs comprises four articulated legs.

* * * * *